March 2, 1943. L. I. KOMIVES ET AL 2,312,652
CABLE JOINT AND PROCESS
Filed Jan. 18, 1941
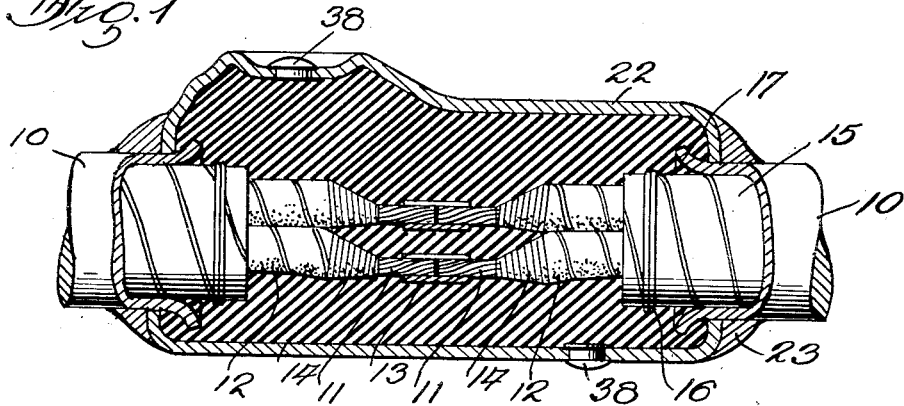
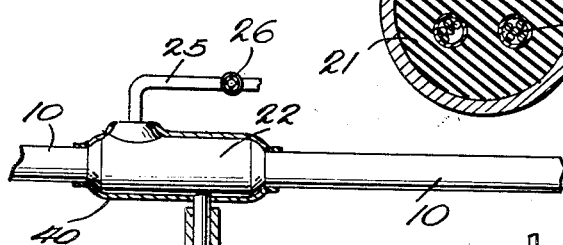
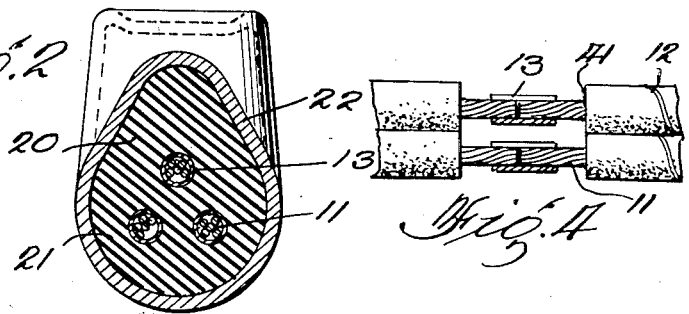
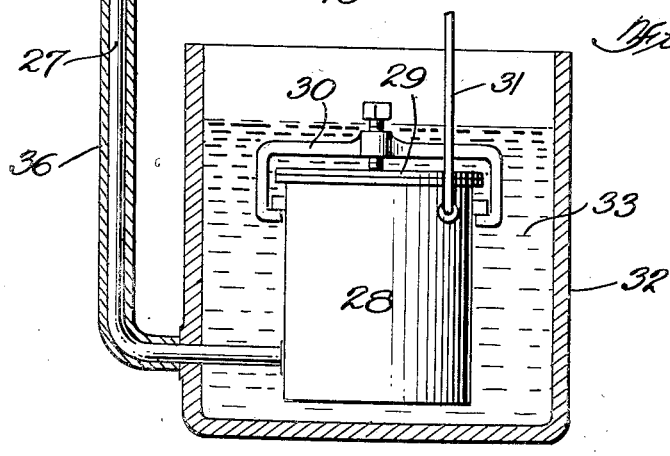
Inventor
Laszlo I. Komives &
John D. Piper
By Watson, Cole, Grindle
& Watson
Attorney

UNITED STATES PATENT OFFICE 2,312,652

CABLE JOINT AND PROCESS

Laszlo I. Komives and John D. Piper,
Detroit, Mich.

Application January 18, 1941, Serial No. 375,062

9 Claims. (Cl. 174—21)

This invention relates to joints or splices for power cables and to processes and/or steps therein for forming the same.

More particularly the invention relates to joints for high voltage, metal sheathed cables insulated with non-massive insulations with or without impregnation and wherein there is formed, about the conductor connector and between it and the joint sleeve, a monolithic encasement of an artificial resin or plastic, hardened in position solely by a change in temperature thereof in the total absence of any reactions or by-products.

It is a general object of the present invention to provide a novel and improved joint for electric conductor cables, improved joint materials, and improved processes and steps for forming the joint and using the materials.

More particularly it is an object of the present invention to provide a field type of joint for high voltage electric cables which can be made materially smaller in all dimensions than the usual built-up type of joint, which can be made much faster and which will be more efficient and satisfactory in every respect.

An important object of the invention consists in the formation of a joint between sections of high voltage, metal sheathed conductor cables insulated with fibrous or similar materials impregnated with an insulating grease, oil, or other initially fluid impregnant wherein the exposed metal of the conductors and their connector is insulated from the joint sleeve and the sheaths of the sections solely by a plasticized resin bonded to the metal and non-fluid insulation parts within the sleeve and which is substantially insoluble in and incompatible with the insulation fluid and transformer insulating oil.

An important feature of the invention consists in the provision of a cable joint of the type described wherein the monolithic insulation is an oil resistant, lineal, macromolecular, thermoplastic resin containing a substantial proportion of an aromatic or hydroaromatic plasticizer which is itself at least partially soluble in the plastic and does not deleteriously affect the di-electric strength or insulation qualities thereof, is itself insoluble or poorly soluble from the mixture in the cable insulation fluid and/or transformer oil and which does not impart the property of solubility in these fluids to the combined plastic.

A further object of the invention consists in the provision of a bond between the original non-fluid insulation in the cable sections and the monolithic thermoplastic resin insulator by means of a treatment of the solid insulation and its impregnant prior to the injection of the final insulant by means of a bonding resin in solution in a solvent capable of dissolving the insulating oil so as to permit the bonding resin to occupy the pores of the outer portion of the original solid insulation, the solvent being readily volatile and the bonding resin preferably compatible with or soluble in the main insulating resin at the injection temperature.

Another important feature of the invention consists in the combination of an artificial resin and a plasticizer for the same which are compatible and in the mixed condition are sufficiently fluid at a temperature below the charring point of the factory insulation in the cable as to be readily introduced into the joint, which will harden to a sufficient degree at the highest operating temperature to provide adequate strength, resilience, resistance to puncture, and resistance to dissolving in the insulating fluid of the cable or in such transformer insulating oils as may leak therein.

Still another important feature of the invention consists in the use of a bonding material in solution in a volatile solvent for treating the original factory insulation wherein said solvent is compatible with, but also a solvent of, the oily insulation originally in the cable and serves to remove it from the outer layers of the solid insulation to permit replacement thereof by the bonding material, which bonding material has the characteristic of adhering to both the solid insulation and the introduced plastic to provide an interface bond of high dielectric strength.

A further feature of the invention consists in the arrangement of a splice between two sections of high voltage, metal sheathed cable in which a plastic resin hardened solely by cooling forms the insulation between the bare copper conductors and their connector and the joint sleeve for the sheaths, which insulation has between these two conducting parts, a thickness of less than that necessary to prevent breakdown in air between these conducting parts at the normal working potential of the cable.

Other and further objects and features of the invention will be more apparent to those skilled in the art upon a consideration of the accompanying drawing and following specification wherein a single exemplary embodiment of the invention and of the method is illustrated and described with the understanding that such departures may be made from the illustrative disclosures as fall within the scope of the appended claims without departing from the spirit of the invention.

In said drawing:

Figure 1 is a longitudinal section through a joint constructed in accordance with the present invention and formed between two sections of a belted, three-conductor, paper insulated, lead sheathed cable;

Figure 2 is a transverse section taken on line 2—2 of Figure 1;

Figure 3 is a schematic illustration of the joint and associated apparatus necessary for carrying out the method; and Figure 4 is a fragmentary view similar to Figure 1 showing a slight modification.

In the practical use of high voltage cables, particularly for underground service, joints, or splices between sections of the same must be made in manholes where working conditions are obviously not of the best. Manholes are costly to construct and any reduction in their size which becomes feasible permits a reduction in the cost. The conventional cable joints as now made in the field are cumbersome, bulky, and costly both in material and time, and introduce a weakness in the cable, where the insulation at best is seldom as good as that in the original portion of the cable, and where deterioration often causes a breakdown after a relatively short period of use. The large size of these joints requires large manholes for their accommodation.

There has been a great need of and demand for an improved type of cable joint but to date no satisfactory substitute for the present type of built-up, paper wrapped, compound filled joint has been devised which is capable of formation in the field with sufficient rapidity, certainty of results and insured long life to make it a feasible substitute.

The type of cable most commonly used for underground service at voltages of the order of 5 to 50 kv. comprises a stranded conductor covered with paper or other fibrous tape to provide a laminated insulation which during or after winding is saturated with some form of insulating fluid usually of an oily or greasy nature such as petrolatum or the like. Where several conductors are enclosed in a single metal sheath it is customary to belt the insulated conductors together by a separate layer of paper tape to provide additional insulation to ground.

In joining sections of such cable, the sheath is removed from each end for a considerable distance and sufficient belting is removed to permit the individual conductors to be splayed out. Then the end of each conductor has the paper removed for a distance sufficient to permit the assembly and soldering thereon of a connector. Paper, varnished cambric, or other fibrous tapes possessing high di-electric strengths are then wound over the connector and for a considerable distance over the paper insulation on each section. Additional layers of tape are wound over the center of each of these built-up portions to provide sufficient separation for the various conductors and then a joint sleeve is placed over the whole, soldered to the original sheaths, and filled with a heavy consistency compound, the sole purpose of which is to exclude air and moisture and to act as a filling to prevent the cable insulating compound from migrating into the space and thus starving the other portions of the cable. Such filling also tends to reduce the flow of transformer oil into such joints.

The necessity for the great length of the conventional joint, which in a 4.8 kv. cable is more than fifteen inches is that the voltage breakdown strength of the path between the original paper insulation and the hand applied insulation is not very high. There is no bonding between these paper tapes wound over the connector and that of the original insulation of the sections to improve this voltage breakdown strength, and hence the great length of path which tends to prevent flashover or other breakdown.

The great diameter of the old type of joint results from the added layers of paper and the final taping to spread the connectors sufficiently to provide the necessary long insulation paths. These joints are costly in time and materials and are none too satisfactory. They are usually the weakest points in the system and deteriorate fairly rapidly with age. They are subject to early break-downs if great care is not exercised in eliminating moisture and foreign matter during their formation and this is no easy task in a manhole, the walls of which are usually dripping moisture.

It is apparent that if the length and diameter of a joint are to be reduced the obstacles causing the size of the present type of joint must be eliminated. First among these is to increase the voltage breakdown strength along the unbonded surface path between the bared conductor and the sheath. This can be greatly improved by a bonding of the applied insulation to the original insulation but this bond must be of a type not susceptible to deterioration and which can be unerringly duplicated in field service. To reduce the diameter of the joint it is necessary that the added insulation have a breakdown strength which is relatively high and be applied in such a manner as to insure against air pockets or other points of weakness which might cause a concentration of potential resulting in the gradual breakdown of the whole. Such insulation must be permanent, compatible with the insulating fluid in the original cable insulation, must be insoluble in the insulation fluid or in transformer oil, should preferably be homogeneous and not subject to deterioration with age.

The various qualifications placed on the insulation for use in the joint dictate its type. It must be a plastic and preferably an artificial resin which can be molded in position in the joint after the joint sleeve for the two sections of the sheath is wiped in place. It has already been proposed to use such materials as wax for this purpose, particularly in connection with signaling cables, but the melting point of waxes is too low to stand the operating temperatures of a power cable, and such waxes would be soluble in the usual impregnants of such a cable.

It has likewise been proposed to use such plastics as the phenol-formaldehyde resins which are solidified in situ by a condensation process, after introduction as a liquid. This type of artificial resin, however, is entirely inadequate for the purpose primarily because of the manner of hardening it in position. The condensation process results in the formation of by-products of watery and gaseous natures, both of which are highly undesirable within the joint. The watery products impair the original insulation at and beyond the joint and the gaseous products cause foaming which seriously impairs the dielectric strength of the applied resin. There is a large percentage of shrinkage resulting from the condensation which precludes satisfactory bonding to the materials within the joint even though under the best conditions such bonding could be attained. Furthermore, the condensation process requires the application of such high temperatures, for such an extended period of time that the materials of an ordinary joint will be decomposed or seriously weakened.

Complete bonding between all metal and insulation parts and the introduced resin is essential where the joint is also to constitute a fluid stop and it is highly desirable that all joints be of this type to prevent migration of cable and transformer oils resulting from operating changes in temperature and static head due to position gradients. Materials which harden by polymerization have been proposed since they have an effective bonding with the metal and insulation parts within the joint but they do not offer sufficient possibility of simplification in the method of forming the joint, since if used in monomeric form they are difficult to harden within the cable sleeve and are subject to porosity. Considerable shrinkage also occurs during the hardening, and, owing to the necessity for the use of certain catalysts to accelerate the polymerization and reduce the amount of heating required, volatilization and gas formation occur and sometimes deleterious by-products of a liquid nature are formed. Also polymerization is usually an exothermic reaction and difficult to control.

Certain polymers of the artificial resin type are, however, known to be excellent insulators and a number of them are of the thermo-plastic type, i. e. they are relatively solid at the highest operating temperatures of cables but can be softened sufficiently for introduction by injection into a cable joint at relatively low temperatures. The amount of shrinkage occurring during the hardening by cooling is only on the order of one-tenth as much as might occur with other hardening processes and can be largely eradicated by proper handling.

In order to insure suitable mechanical properties, it is essential that the resin be plasticized by some material which reduces the brittleness of the original plastic but which does not render the whole mass appreciably soluble or dispersible in cable or transformer oils. Furthermore, the plasticizer must be of such a nature that any small amount of it which may be dissolved from the surface of the plastic mass may not seriously impair the di-electric properties of the cable insulation. The plasticized mass must be sufficiently rigid so that oil cannot pass through it mechanically and the whole must be capable of being bonded to all of the materials within the joint.

It will perhaps be simpler to visualize the needs for the various physical and chemical characteristics of the materials used in forming the joint if it is first described together with the method of forming the same by reference to the accompanying drawing.

Figures 1 and 2 illustrate at 10 the ends of a conventional three-conductor, paper insulated, belted, lead sheathed cable in which the stranded conductors 11 of the sections which are to be spliced are bared by removing the original insulation 12 from short lengths at the ends thereof to enable the connectors 13 to be applied and soldered thereto in the usual manner. These connectors are preferably thin, phosphor bronze sleeves which when filled with solder prevent passage of oil longitudinally of the conductor strands. The insulation if of paper tape may be penciled as shown at 14 although this formation is not essential and a straight radial cut may be used if desired or a more conventional stepped arrangement.

The original insulation of the cable whether of paper or other fibrous material may be considered as non-massive to distinguish it from molded insulations, such as rubber, gutta-percha, and the like. The belting 15 is shown as removed almost as far back as the sheath and tied down as at 16 in a more or less conventional manner. The distance over the surface of the insulation 12 and 15 from the bared conductor 11 to the sheath flare 17 is less than that necessary to provide resistance sufficient to prevent breakdown at or near the operating voltages of the cable. This resistance is therefore less than that of the insulation through the original portions of the cable between any conductor and the adjacent conductor or any conductor and the grounded sheath. Normally the insulation in such cables is impregnated with an oily fluid and has a di-electric strength of at least 50 volts per mil. The conductors of the cable sections are not splayed apart as can be seen from Figure 2 where the spacing between conductors as shown at 20 is substantially identical with the spacing between any connector and the sheath as at 21. Either of these spacings is entirely inadequate to provide suitable insulation in air at the working potential. In these several respects even before the joint is insulated its physical aspects are different from the present day type of joint where all of the distances just discussed are much greater.

A treatment to permit adequate bonding of the introduced softened plastic to the original solid insulation within the joint may be applied before or after the application of the joint sleeve 22 which is securely wiped as at 23 to the metal sheaths of the original cable sections. As seen in Figure 3, two openings are provided in the joint sleeve 22, the upper one accommodating a pipe or tube 25 equipped with a suitable valve 26 and leading to the atmosphere or to a source of air under pressure and the lower one 27 leading to a closed container 28 for the plastic which is to be injected. This container may be sealed by a suitable cover 29 and clamp 30 and a tube 31 permits the introduction of fluid under pressure onto the surface of the molten plastic to eject the same through tube 27. Alternatively direct mechanical pressure may be resorted to whereby better control of the rate of injection may be had.

The plastic container 28 is fully immersed in an outer container 32 filled with a bath 33 of such material as will give the proper temperature to the plastic. Oil or even solder may be used for the purpose where a temperature on the order of 200° C. is desired. A heater 35 is shown beneath the outer container for maintaining the desired temperature before and during the injecting operation. The delivery tube 27 of relatively small diameter is shown as fitted with thermal insulation 36 to prevent premature cooling of the thermo-plastic resin therein, and along the same line, the joint parts may be preheated if desired. This small diameter of the tube is preferred to simplify the closing of the openings left when they are removed or cut off as indicated at 38 in Figure 1.

In practicing the process the bonding agent in solution may be several times painted on the paper insulation in excess quantity prior to the positioning of the lead sleeve and the volatile solvent allowed to evaporate, leaving the bonding resin in the outer layers of paper and on the surface thereof. The bonding resin should preferably be of such a nature that it does not soften the plastic at the interface between the plastic and the paper at cable operating temperatures. In practice it has been found convenient to use a bonding material having a melting point above the cable operating temperatures. If the sleeve 22 is put into position first, then a quantity of bonding solution is introduced therein and withdrawn several times to insure the washing away of the oily insulation from the surface of the paper and its permanent replacement by the bonding resin. After withdrawing the last of this solution a current of air may be blown through the casing to evaporate the solvent.

The plasticized resin, having been brought to its softened condition in the heating vessel, is delivered through the tube 27 by the application of pressure on the surface of the material and is forced into the casing, the air being allowed to escape ahead of it at the same time from the other tube or outlet to make room for the plastic. The escape valve may be partially closed or loaded to maintain some positive pressure in the joint to prevent vaporization of any materials therein which might form voids and to retain the cable insulating fluid in position. The temperature of the plastic, when introduced into the casing, is less than the charring temperature of the paper insulation but sufficient to cause bonding between the introduced material and all of the surfaces exposed within the casing. After the casing is completely filled with the plastic the valve in the escape tube may be closed but the plastic delivery tube should be kept connected and the plastic in the kettle retained at its melting temperature with pressure on the same so as to fill up the casing following any shrinkage which may take place during the cooling of the monolithic block now cast about the joint. If it is found desirable, the cooling may be accelerated by appropriate measures.

The artificial resin may be broadly defined as residing in the class of polymeric, oil-resistant, essentially lineal, macro-molecular thermo-plastics, and prominent among those suitable for the purpose are the polymers of styrene, methylmethacrylate, ethyl cellulose, and cellulose acetate. The material should soften at such a temperature that it can be introduced into the sleeve without damaging the cable paper. It should, however, be sufficiently rigid at all cable operating temperatures (70° to 100° C.) to prevent movement of cable impregnant across the joint. The resin should be wholly free from electrolytic impurities which may become sorbed by the cable paper, it should not be soluble in cable or transformer oil, it should be sufficiently adhesive to form a good bond to all materials in the joint and to weld together where the entering stream meets around the conductor.

The plasticizer, as already mentioned, should be compatible with the basic plastic and should not render the same oil-soluble. It can, with proper selection of the basic plastic, lower the softening temperature or even raise it so that the flow temperature of the composite material is of the order of 150°-225° C. Such a plasticizer for use, for instance, with some of the mentioned basic plastics, should be an aromatic or hydro-aromatic liquid or oil such as polyindene, polycumarone, or combinations of these or similar materials with or without hydrogenation; polystyrene of low molecular weight such as di-, tri-, or tetrastyrene, with or without hydrogenation; hydrogenated esters of abietic acid (a terpenic carboxylic ester). The plasticizer should be such a compound that it is non-polar or weakly polar so as to prevent dielectric losses resulting from conduction or dielectric absorption. It should be mutually soluble with the plastic used, in the concentration required, over the temperature range of —10° C. to 225° C., have a boiling point above the temperature of the plastic at the time of introduction into the joint and preferably above 275° C., have no appreciable content of tar-like impurities that may become dispersed in the impregnant to deteriorate its di-electric properties, nor should it form such impurities under the conditions of use. Its conductivity should approach that of the impregnant, preferably less than 10-12 mhos./cch.$^3$ at 60° C.

In general the combined plastic should contain from 85% to 65% of the basic material and from 15% to 35% of the plasticizer. The temperature of the final plastic compound when in the melting pot prior to injection should be around 200° C. so that the delivered material will be above the bonding temperature but below the boiling point of any ingredient in the mixture. Note here that the boiling point will change as the material leaves the vessel under pressure and enters the region of lower pressure surrounding the joint. The temperature of delivery must also be below the charring point of the factory insulation, below the decomposition temperature of the plastic itself, and above any temperature where the flow becomes insufficient at the pressure used.

The pressure of injection in the melting kettle may be as high as 2000 lbs. per square inch while the pressure to which the joint can be subjected can be increased to about that figure by the use of a reinforced sleeve or temporary reinforcement for the sleeve 22 during the injection process. Such a reinforcement is shown at 40 in Fig. 3 as a steel sleeve and may be clamped in position in any desired manner to closely conform to the sleeve 22 and adjacent portions of the sheath sections.

The di-electric strength of approved plastic compositions should be of the order 500-700 volts per mil, but it will be noted that in monolithic structures the resistance to puncturing does not increase directly with the thickness nor even follow the almost straight line characteristics of a laminated material, such as the paper insulation of the cable.

In order to obtain an appropriate di-electric strength, at the interface between the factory insulation and the molded plastic, which is substantially as good as that through the normal cable insulation or through the relatively thin layer of plastic surrounding the bare copper, an interface bond is essential and may be obtained in the manner previously described.

The bonding material is preferably an artificial resin such as hydrogenated indene-cumarone hardened by polymerization and dissolved in some volatile solvent of the oil in the cable and the bonding material. Benzene may be used for the purpose or some other hydrocarbon solvent which is compatible with the bonding substance and the cable oil and is sufficiently volatile to be eliminated rapidly before introducing the thermo-plastic.

The bonding material must be very carefully selected in order that it have a number of important and essential characteristics. It or its solution in a solvent such as monomeric styrene or benzene must be mutually soluble in both the cable oil, if it is to be used with such an insulated cable, and in the plastic compound at the introductory temperature thereof. It should form a very adhesive film over the surface of the non-massive insulation in the joint and yet be sufficiently viscous to keep the cable oil away from the interface after the same has been removed by the previously described treatment. It should not soften the plastic at the interface at operating tempertures nor decompose at must not adversely affect the di-electric properties of the materials with which it is in contact. Its own rigidity must not be seriously affected when blended into the plastic at the interface and it must not soften this interface to decrease its di-electric or mechanical strength. It must be sufficiently heat stable so that it does not decompose when in contact with the hot plastic and it must not adversely affect the di-electric properties of the cable oil. The solution of the bonding material and its solvent must be of sufficiently low viscosity to drain well from the joint so that no excess of the bonding material remains in the joint.

If the basic plastic, the plasticizer, and the bonding agent are properly selected, a field joint may be made with much greater facility and at a much less consumption of time and labor than joints of the type at present in use. At the same time it will be between one-half and one-third of the length of present day joints and not more than two-thirds of the diameter of the same. Such a joint instead of diminishing in effectiveness with age maintains its full efficiency throughout its life which is at least equal to that of the cable sections which it joins. Fortunately, the coefficient of thermal expansion of the plastic can be brought to closely correspond to that of the materials in the original cable which, together with the inherent elasticity of the material makes it strongly resistant to service changes in temperature which therefore have a non-detrimental effect on the joint.

As an example of a successful joint of the type just described may be mentioned one formed between two sections of a three-conductor, round, belted, paper insulated, lead covered cable of No. 2 American Wire Gauge conductor intended for operation at 4.8 kilovolts. Such a joint had an over-all length of approximately six inches and a diameter of approximately two inches. The plastic comprising 60% polystyrene, 35% Hercolyn, and 5% styrene was introduced with the use of suction and pressure at a temperature of 215° C. through a $19/64$ inch inside diameter tube in the bottom of the joint sleeve in fourteen minutes, giving a complete filling of the sheath as indicated by a subsequent opening of the same after a test for di-electric strength. The joint withstood 42.4 kilovolts for five minutes at a temperature of minus 10° C., broke down for the first time at 67 kilovolts and on a second application of current at 32.5 kilovolts, but it is to be noted that these breaks occurred about one and one-half inches from the joint and in the original cable insulation. The bond between the original paper insulation and the monolithic plastic was effected by using a mixture of polystyrene in monomeric styrene. This material was applied warm in two applications, the second one being of a "soupy" consistency.

The use of 5% monomeric styrene in the plastic serves to reduce its consistency and increase the speed of introduction. Perhaps most of this material, which is quite volatile, was drawn off through the vacuum connection and the remainder polymerized by the temperature of the mixture.

The material Hercolyn comprising the plasticizer is a hydrogenated methyl abietate which is quite stable to heat. An inspection of the monolithic plastic upon opening the joint shows it to be of a firm consistency without brittleness and of sufficient rigidity to prevent damage to the joint by any mechanical manipulation required in the normal handling of the same. The bond between the original insulation and the injected plastic was excellent as can be determined from the breakdown voltages applied.

Figure 4 illustrates an embodiment differing only slightly from that shown in Figure 1, the main difference being that the insulation 12 on the individual conductors instead of being pencilled as at 14 is cut down radially as at 41 substantially at right angles to the axis of the conductor. This provides a substantial increase in the length of surface or interface between the molded plastic and the factory insulation of the cable along the path from the conductor to the sheath and thereby improves the insulation. This type of treatment is more suitable where the bonding material is flowed into and then out of the sleeve 22 for the radial cut surface presents some difficulties in a dobbing or painting treatment. It is of course easier to provide the radial cut than the pencilled form and on many occasions it will be desired.

Having thus described the invention, what is claimed as new and desired to be secured by Letters Patent is:

1. A joint between two sections of lead-sheathed cable having oil impregnated fibrous insulation, comprising, a permanent joint sleeve secured to the cable sheaths in a fluid-tight manner, the factory insulation being removed to provide space for a connector tube joining the two conductor sections, the sheath of each section being removed for only such a distance as to produce a surface path between the sheath and conductor having a materially lower voltage breakdown strength than that substantially radially through the normal cable insulation and a homogeneous, thermoplastic, rigid plastic completely filling all of the space within the sleeve not occupied by the parts of the original cables and their connector tube, said plastic being bonded to the factory insulation by a bonding material impregnating the outer surface of the factory insulation, said material being sufficiently viscous to keep the oily impregnant from the interface, the dielectric strength of the bond along the interface being at least equal to that of the original cable insulation, the plastic being hardened in situ solely by temperature change and without the production of any gaseous, liquid or solid by-products, said plastic being substantially inert in the presence of cable insulation and transformer oils and greases.

2. A joint formed between two sections of metal-sheathed, stranded-conductor cable insulated with fibrous material impregnated with an oily fluid, a connector joining the bared ends of the conductors, each section having the sheath removed to provide a "conductor to sheath" surface path having a substantially lower breakdown potential than that of a normal portion of the cable, a joint sleeve secured to the section sheaths in a fluid-tight manner and having a minimum spacing from any bared conductor of less than that necessary to prevent breakdown with air insulation at the working potential of the cable, a homogeneous, rigid plastic filling all of the remaining space in the sleeve, means extending over and below the surface of the fibrous insulation and completely bonding said plastic to the fibrous insulation to increase the breakdown potential of said path to at least equal that of the original cable insulation, said plastic having such a di-electric strength as to insulate said bared conductor to a value at least equivalent to that of the original cable insulation, said plastic being substantially inert in the presence of cable and transformer oils and greases.

3. A joint formed between two sections of metal-sheathed, stranded-conductor cable insulated with fibrous material impregnated with an oily fluid, a connector joining the bared ends of the conductors, each section having the sheath removed from the original insulation only such a distance from said connector as to provide a "conductor to sheath" surface path having a substantially lower breakdown potential than that of a normal portion of the cable, a joint sleeve secured to the section sheaths in a fluid-tight manner and having a minimum spacing from any bare conductor of less than that necessary to prevent breakdown with air insulation at the working potential of the cable, a homogeneous, rigid plastic filling all of the remaining space in the sleeve, means bonding said plastic to the fibrous insulation to increase the breakdown potential of said path to at least equal that of the original cable insulation, said plastic having such a di-electric strength as to insulate said bare conductor to a value at least equivalent to that of the original cable insulation, said bonding means including a resin compatible with both the introduced plastic and the original impregnating fluid, serving to at least partially replace this fluid on the exposed original insulation and to a slight depth therein, the bonding means being sufficiently viscous to form a barrier to prevent this fluid returning to the interface and being non-reactive with the plastic at working temperatures.

4. A joint for two sections of high-voltage, metal-sheathed, conductor cable insulated with non-massive material and an insulating fluid, said insulation having an operating di-electric strength of at least fifty volts per mil, a connector for said conductors, said insulation being removed from each conductor a sufficient distance to receive said connector, the sheath being removed from each section to a distance somewhat greater than the insulation to leave a "conductor to sheath" path over the insulation having a substantially lower voltage breakdown strength than that first recited, a joint sleeve sealed to the section sheaths and having a minimum spacing from said connector less than that necessary to prevent breakdown in air at the working potential of the cable, a homogeneous, rigid plastic filling all of the remaining space in said sleeve and a viscous plastic so bonding the rigid plastic to said non-massive insulation as permanently to raise the di-electric strength of said path to at least equal that of the original cable insulation.

5. A joint for two sections of high-voltage, multi-conductor, metal-sheathed cable insulated with non-massive, absorbent material and an impregnating insulating fluid to have an operating di-electric strength of at least fifty volts per mil, connectors for said conductors, said insulation being removed from each conductor for the reception of the connectors, the sheath being removed from each section to such a greater distance than the insulation as to leave "conductor to conductor" and "conductor to sheath" paths over the insulation surfaces having substantially lower voltage breakdown strengths than that first recited, a joint sleeve sealed to the section sheaths, the connectors being spaced from each other and the sheath a distance less than that necessary to prevent breakdown in air at the working potentials of the cable, the remaining space in said sleeve being wholly filled under pressure with a homogeneous, oil resistant, lineal, macromolecular thermoplastic resin, means bonding said resin into the pores of said non-massive insulation and to the metal within the sleeve and serving to exclude said insulating fluid from the interface, said resin being sufficiently elastic that it will not crack at the lowest operating temperatures by reason of unequal shrinkage.

6. The method of forming a joint between two sections of high-voltage, metal-sheathed, conductor cable insulated with fibrous and fluid insulation comprising, baring the conductor ends, joining said ends, removing the sheaths for a greater distance than the insulation, sealing a joint sleeve to the sheaths, treating the exposed insulation with a solution of a bonding resin in a solvent of the insulating fluid, evaporating said solvent, softening a thermoplastic resin and simultaneously introducing said softened resin into said sleeve at a temperature below the charring point of said fibrous insulation and removing the air therefrom until the resin completely fills the sleeve.

7. The method of insulating a conductor splice between two sections of high-voltage, metal-sheathed cable originally insulated by non-massive and fluid insulation which consists in treating the exposed insulation with a solution of a bonding resin in a volatile solvent compatible with the said fluid insulation to replace the same to a slight depth below all insulation surfaces, forming a permanent casing around the splice, wiping said casing to the section sheaths, softening a thermoplastic resin compatible with said bonding resin, injecting said molten resin into the casing at a temperature and for a time insufficient to char the cable insulation and cooling said resin into a solid, homogeneous material bonded to the non-massive insulation, insoluble in the fluid insulation and having a high di-electric strength.

8. The method of insulating a conductor splice between two sections of high-voltage, metal-sheathed cable originally insulated by paper tape impregnated with an oily fluid, which consists in wiping the fluid from the exposed paper, treating the cleaned surfaces with a bonding agent dissolved in a volatile solvent for said oily fluid to displace the same in the outer layers of paper and leave the agent therein, forming a permanent casing around the splice, sealing said casing to the section sheaths, injecting under pressure into said casing a heat softened, polymerized resin which hardens on cooling to a homogeneous solid bonded to the paper and metal, maintaining a pressure column of the molten plastic associated with the casing until the resin has solidified and closing the admission opening, the solidified resin forming the sole insulation for the splice.

9. The method of forming a bond between fibrous cable insulation impregnated with an oily fluid and a thermoplastic resin applied to the same at an elevated temperature comprising pre-treating said fibrous insulation with a solution of a bonding resin in a volatile solvent for said oily fluid to remove said fluid from the outer zone of said fibrous insulation and to replace the same with said bonding resin, evaporating the solvent and applying the thermoplastic resin while the bonding resin is still adhesive.

LASZLO I. KOMIVES.
JOHN D. PIPER.